(12) United States Patent
Johnson

(10) Patent No.: US 7,773,555 B1
(45) Date of Patent: *Aug. 10, 2010

(54) EXTENSION OF AN ETHERNET BACKHAUL SYSTEM FOR WIRELESS BASE STATIONS OVER A CABLE TELEVISION DISTRIBUTION NETWORK

(75) Inventor: Harold W. Johnson, Roach, MO (US)

(73) Assignee: Sprint Communications Company L.P., Overland Park, KS (US)

(*) Notice: Subject to any disclaimer, the term of this patent is extended or adjusted under 35 U.S.C. 154(b) by 1155 days.

This patent is subject to a terminal disclaimer.

(21) Appl. No.: 11/103,206

(22) Filed: Apr. 11, 2005

(51) Int. Cl.
*H04W 4/00* (2009.01)
*H04L 12/50* (2006.01)
*H04L 12/66* (2006.01)

(52) U.S. Cl. .................. 370/328; 370/338; 370/386; 370/463

(58) Field of Classification Search ............ 370/328, 370/335, 342, 338, 386, 463
See application file for complete search history.

(56) References Cited

U.S. PATENT DOCUMENTS

| | | | |
|---|---|---|---|
| 5,890,062 | A | 3/1999 | Courtney et al. |
| 6,349,138 | B1* | 2/2002 | Doshi et al. ............ 380/200 |
| 6,373,817 | B1* | 4/2002 | Kung et al. ............ 370/217 |
| 6,377,982 | B1 | 4/2002 | Rai et al. |
| 6,421,714 | B1* | 7/2002 | Rai et al. ............ 709/217 |
| 6,535,739 | B1 | 3/2003 | Chen et al. |
| 6,967,938 | B1 | 11/2005 | Kang et al. |
| 6,980,516 | B1* | 12/2005 | Wibowo et al. ............ 370/235 |
| 7,043,270 | B2 | 5/2006 | Judd et al. |
| 7,170,871 | B2 | 1/2007 | Eyuboglu et al. |
| 7,248,560 | B1 | 7/2007 | Blankenship et al. |
| 7,274,934 | B2* | 9/2007 | Arazi et al. ............ 455/436 |
| 7,305,240 | B2* | 12/2007 | Chou et al. ............ 455/450 |
| 7,436,782 | B2* | 10/2008 | Ngo et al. ............ 370/254 |
| 2002/0191572 | A1 | 12/2002 | Weinstein et al. |
| 2002/0191635 | A1* | 12/2002 | Chow et al. ............ 370/463 |
| 2004/0156313 | A1* | 8/2004 | Hofmeister et al. ......... 370/229 |
| 2004/0170153 | A1 | 9/2004 | Stewart et al. |

(Continued)

FOREIGN PATENT DOCUMENTS

EP 1198147 4/2002

(Continued)

OTHER PUBLICATIONS

U.S. Appl. No. 11/102,971, filed Apr. 11, 2005.

*Primary Examiner*—Daniel J. Ryman
*Assistant Examiner*—Thinh D Tran

(57) ABSTRACT

Base stations exchange first information with first users over first wireless communication links. A mobile switching center provides mobile telephone service. An Internet access system provides Internet access service. A data system provides a data service. An Ethernet backhaul system uses an Ethernet format to exchange the first information between the first base stations and the mobile switching center, the Internet access system, and the data system. A second base station exchanges second information with second users over second wireless communication links. A first interface is exchanges the second information with the second base station. A second interface exchanges the second information with the first interface over a cable television distribution network. The Ethernet backhaul system uses the Ethernet format to exchange the second information between the second interface and the mobile switching center, the Internet access system, and the data system.

14 Claims, 12 Drawing Sheets

U.S. PATENT DOCUMENTS

| | | |
|---|---|---|
| 2004/0202203 A1* | 10/2004 | Kolze et al. .................. 370/503 |
| 2004/0259533 A1 | 12/2004 | Nixon et al. |
| 2005/0141460 A9* | 6/2005 | Currivan et al. ............. 370/335 |
| 2006/0160566 A1 | 7/2006 | Plahte et al. |
| 2006/0227767 A1 | 10/2006 | Johnson et al. |
| 2007/0127417 A1 | 6/2007 | Kalika |

FOREIGN PATENT DOCUMENTS

| | | |
|---|---|---|
| WO | 9945727 | 9/1999 |
| WO | 0197459 | 12/2001 |

* cited by examiner

EXTENSION OF AN ETHERNET BACKHAUL SYSTEM FOR WIRELESS BASE STATIONS OVER A CABLE TELEVISION DISTRIBUTION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication systems that use Ethernet to exchange user communications between wireless base stations and related service systems, such as mobile switching centers and Internet access systems.

2. Description of the Prior Art

Base stations exchange information with users over wireless links. The base stations exchange the information with various services over Time Division Multiplex (TDM) connections, such T1 connections. The base stations exchange the information with Mobile Switching Centers (MSCs) that provide mobile telephone service. The base stations exchange the information with Internet access systems that provide Internet service. The base stations exchange the information with data systems that provide data services, such as a Voice Over Internet Protocol (VOIP) service or a Push-To-Talk (PTT) service. Since Internet and data services provided from the base stations are rapidly expanding, more communications capacity between the base stations and the services are needed. Unfortunately, TDM connections can be expensive, and they may not be available in some locations where a base station is desired.

Cable television companies are beginning to offer Ethernet connections in metropolitan areas. These Ethernet connections are typically cheaper than comparable TDM connections. Unfortunately, the Ethernet infrastructure of these companies may experience faults that would impair the services provided to users from multiple base stations. In addition, the Ethernet infrastructure of these companies may experience performance degradation that would drop service quality below an acceptable level.

Unfortunately, these companies may not provide adequate fault tolerance or performance measurement data for their Ethernet infrastructure. Ethernet connections have not been effectively deployed to exchange information between the base stations and the services in a fault tolerant manner. Ethernet connections have not been effectively deployed to exchange information between the base stations and the services with appropriate performance monitoring. In addition, third party access to Ethernet services from the base stations has not been effectively deployed.

The cable television companies use a cable television distribution network to distribute television signals to their customers. Typically, each television channel is allocated a six megahertz of bandwidth. A communication technology referred to as "DOCSIS" has been developed to allow modems to communicate across the cable television distribution network over individual television channels. DOCSIS technology and cable television distribution networks have not been effectively deployed to provide an interface between base stations and related service systems, such as MSCs and Internet access systems.

SUMMARY OF THE INVENTION

In some examples of the invention, a communication system is configured and operates as follows. A plurality of first base stations are configured to exchange first information with first users over first wireless communication links. A mobile switching center is configured to provide mobile telephone service. An Internet access system is configured to provide Internet access service. A data system is configured to provide a data service. An Ethernet backhaul system is configured to use an Ethernet format to exchange the first information between the first base stations and the mobile switching center, the Internet access system, and the data system. A second base station is configured to exchange second information with second users over second wireless communication links. A first interface is configured to exchange the second information with the second base station. A second interface is configured to exchange the second information with the first interface over a cable television distribution network. The Ethernet backhaul system is configured to use the Ethernet format to exchange the second information between the second interface and the mobile switching center, the Internet access system, and the data system.

In some examples of the invention, the first interface and the second interface comprise DOCSIS modems.

In some examples of the invention, the first interface and the second interface comprise DOCSIS version 2.0 modems.

In some examples of the invention, the first interface comprises a pseudo-wire system.

In some examples of the invention, the first interface and the second interface are configured to exchange the second information over a cable television channel that is provisioned through the cable television distribution network between the first interface and the second interface.

In some examples of the invention, the first interface and the second interface are configured to exchange the second information over a six megahertz cable television channel that is provisioned through the cable television distribution network between the first interface and the second interface.

In some examples of the invention, the Ethernet backhaul system includes a pseudo-wire system configured to receive the second information from the second interface over an Ethernet connection.

In some examples of the invention, the Ethernet backhaul system is configured to aggregate a first portion of the second information for exchange with the mobile switching center, aggregate a second portion of the second information for exchange with the Internet access system, and aggregate a third portion of the second information for exchange with the data system.

In some examples of the invention, the first interface is configured to exchange third information with a first user site; the second interface is configured to exchange the third information with the first interface over the cable television distribution network; and the Ethernet backhaul system is configured to use the Ethernet format to exchange the third information between the second interface and a second user site.

In some examples of the invention, the first interface and the second interface are configured to exchange the third information over a cable television channel that is provisioned through the cable television distribution network between the first interface and the second interface.

BRIEF DESCRIPTION OF THE DRAWINGS

The same reference number represents the same element on all drawings.

DETAILED DESCRIPTION OF THE PREFERRED EMBODIMENT

The following description and related figures depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Communication System Architecture

Figure 1:
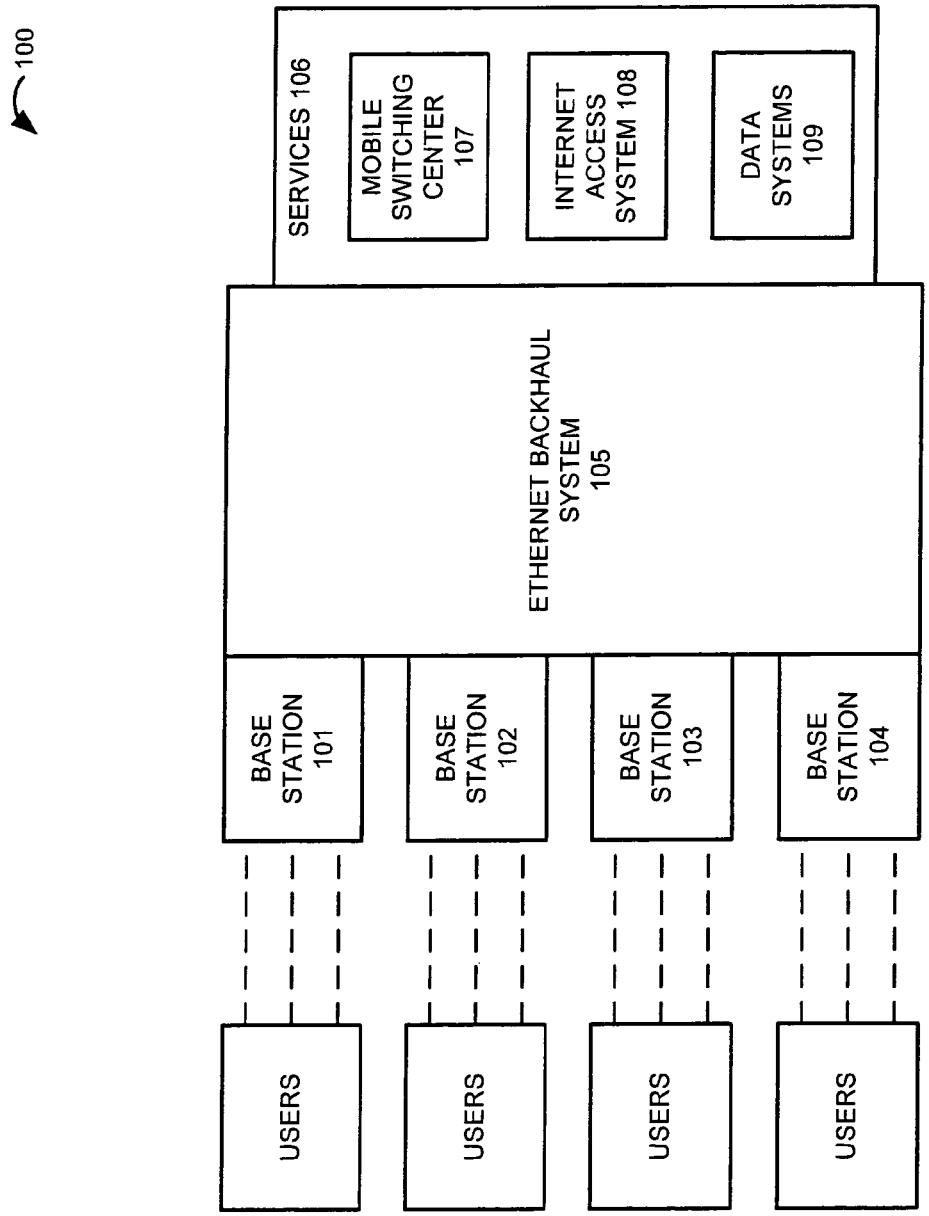
FIG. 1 illustrates a communication system in an example of the invention.

FIG. 1 illustrates communication system 100 in an example of the invention. Communication system 100 includes base stations 101-104, Ethernet backhaul system 105, and services 106. Services 106 include Mobile Switching Center (MSC) 107, Internet access system 108, and data systems 109. In operation, users exchange information with base stations 101-104 over the air using wireless signals (indicated by the dashed lines on FIG. 1). Base stations 101-104 exchange this information with services 106 over Ethernet backhaul system 105.

Figure 2:
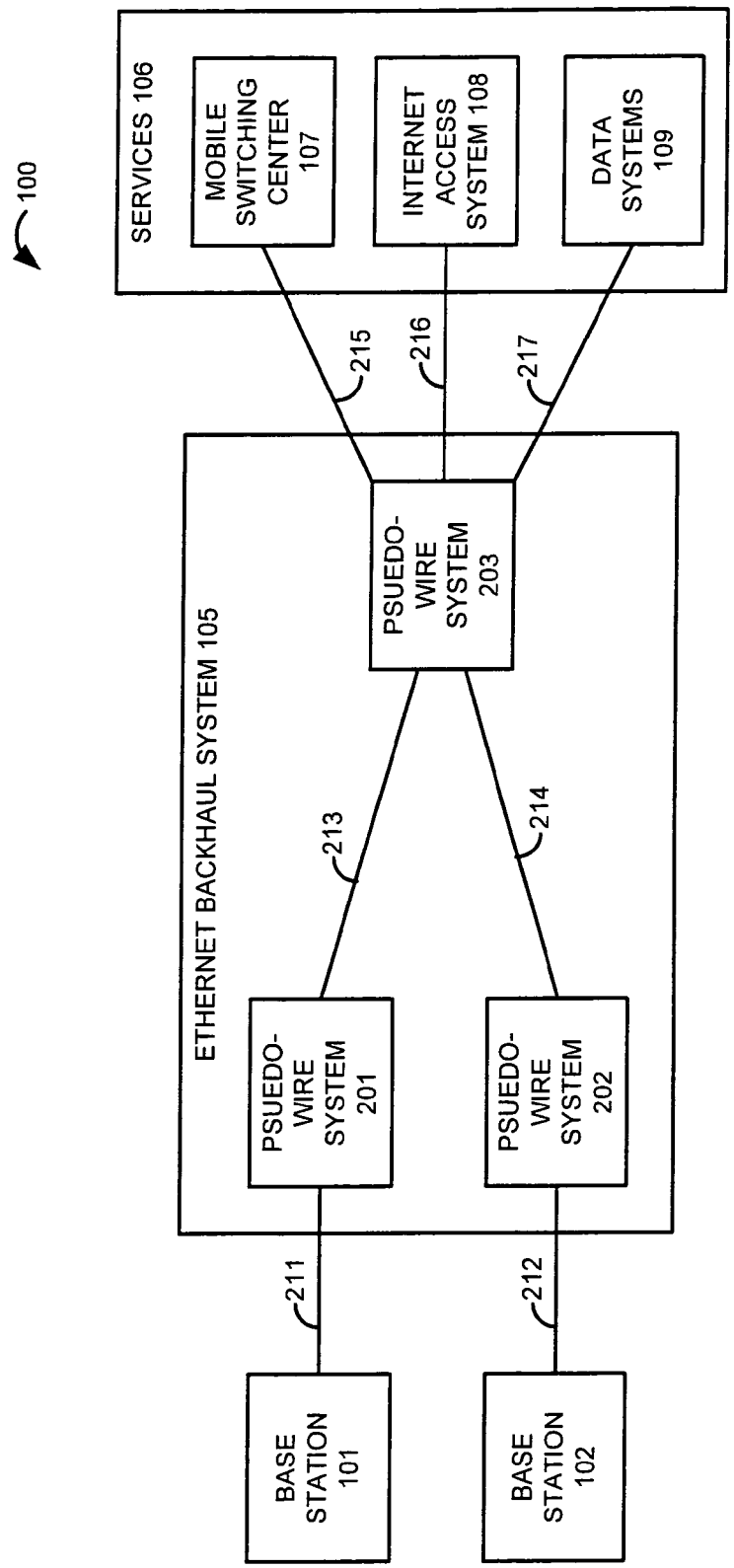
FIG. 2 illustrates a communication system in an example of the invention.

FIG. 2 illustrates communication system 100 in an example of the invention. For clarity, some aspects of FIG. 1 are omitted on FIG. 2. Communication system 100 includes base stations 101-102, Ethernet backhaul system 105, and services 106. Services 106 include MSC 107, Internet access system 108, and data systems 109.

Ethernet backhaul system 105 includes pseudo-wire systems 201-203. Psuedo-wire systems provide T1 functionality over Ethernet connections. Thus, pseudo-wire systems can backhaul T1 traffic from the base stations to the MSC over Ethernet connections.

Psuedo-wire system 201 communicates with base station 101 over links 211. Psuedo-wire system 202 communicates with base station 102 over links 212. Links 211-212 are typically T1 and possibly Ethernet connections, although other types of connections could be used. Psuedo-wire systems 201-202 communicate with pseudo-wire system 203 over Ethernet links 213-214. Ethernet links 213-214 could include intermediate Ethernet nodes and connections. Psuedo-wire system 203 communicates with services 106 over links 215-217. Links 215-217 are typically T1 or Ethernet connections, although other types of connections could be used.

To provide mobile telephone service, base station 101 exchanges information with a mobile telephone user (not shown) over the air in a wireless signal. Base station 101 exchanges this information with pseudo-wire system 201 over a T1 connection in links 211. Thus, base station 101 converts between a wireless format and a T1 format. Psuedo-wire system 201 exchanges the information with pseudo-wire system 203 over Ethernet link 213. Thus, psuedo-wire system 201 converts between the T1 format and the Ethernet format. Psuedo-wire system 203 exchanges the information with MSC 107 over a T1 connection in links 215. Thus, psuedo-wire system 203 converts between the Ethernet format and the T1 format. MSC 107 processes the information to provide mobile telephone service in a conventional manner.

It should be appreciated that base station 101 and MSC 107 exchange information over T1 connections as they have in the past. Note that psuedo-wire systems 201 and 203 have T1 interfaces for base stations and MSCs, but exchange data with one another using the Ethernet format. To base station 101 and MSC 107, pseudo-wire systems 201 and 203 appear like a T1 connection. Advantageously, the Ethernet links are much cheaper to obtain than comparable T1 connections.

To provide Internet access, base station 101 exchanges information with an Internet user (not shown) over the air in a wireless signal. Base station 101 exchanges this information with pseudo-wire system 201 over an Ethernet connection in links 211. Thus, base station 101 converts between a wireless format and an Ethernet format. (Alternatively, base station 101 could exchange the information with pseudo-wire system 201 over a T1 connection, and pseudo-wire system 201 could convert the information to Ethernet.) Psuedo-wire system 201 exchanges the information with psuedo-wire system 203 over Ethernet link 213. Psuedo-wire system 203 exchanges the information with Internet access system 108 over an Ethernet connection in links 216. Internet access system 108 processes the information to provide Internet service in a conventional manner.

Data and voice services are converging in some areas. For example, the walkie-talkie service known as Push-To-Talk (PTT) and the telephony service known as Voice Over Internet Protocol (VOIP) are voice services that utilize data packets, and thus, appear like data services within the network. To provide a PTT, VOIP, or another data service, base station 101 exchanges information with a data user (not shown) over the air in a wireless signal. Base station 101 exchanges this information with pseudo-wire system 201 over an Ethernet connection in links 211. Thus, base station 101 converts between a wireless format and an Ethernet format. (Alternatively, base station 101 could exchange the information with pseudo-wire system 201 over a T1 connection, and pseudo-wire system 201 could convert the information to Ethernet.) Psuedo-wire system 201 exchanges the information with psuedo-wire system 203 over Ethernet link 213. Psuedo-wire system 203 exchanges the information with data systems 109 over an Ethernet connection in links 217. Data systems 110 process the information to provide PTT, VOIP, or another data service in a conventional manner.

Base station 102 could provide these same services in the same fashion, as well as other base stations that are not shown for clarity. Ethernet backhaul system 105 exchanges the information for the services over relatively cheap Ethernet links. Ethernet backhaul system 105 also aggregates the information for multiple services from multiple base stations. For example, pseudo-wire system 203 is a collection point for mobile telephony traffic, Internet access traffic, and data traffic. By aggregating traffic from multiple base stations for multiple services, savings through economy of scale and statistical multiplexing can be attained.

Figure 3:
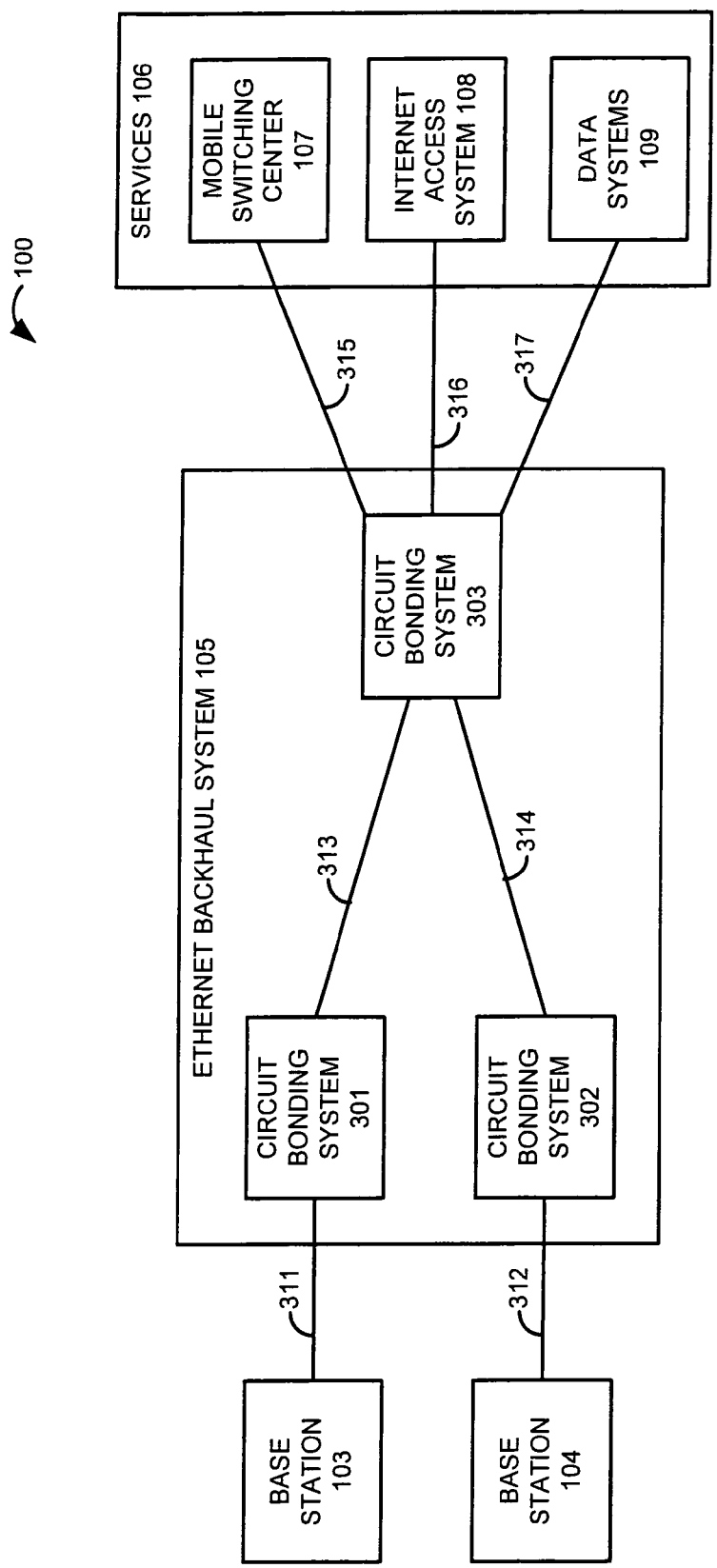
FIG. 3 illustrates a communication system in an example of the invention.

FIG. 3 illustrates communication system 100 in an example of the invention. For clarity, some aspects of FIGS. 1-2 are omitted on FIG. 3. Communication system 100 includes base stations 103-104, Ethernet backhaul system 105, and services 106. Services 106 include MSC 107, Internet access system 108, and data systems 109. Links 315-317 could be transported over an optical communication system, such as a Synchronous Optical Network (SONET) ring.

Ethernet backhaul system 105 includes circuit bonding systems 301-303. Circuit bonding systems 301-303 provide T1 and Ethernet functionality over Time Division Multiplex (TDM) connections. Circuit bonding systems 301-303 exchange traffic with user-side systems (base stations, user sites, services) in formats such as T1, Ethernet, and other protocols. Circuit bonding systems 301-303 exchange this traffic with one another over virtually concatenated TDM circuits. Thus, circuit bonding systems can backhaul T1, Ethernet, and other traffic from the base stations sites to the MSC and other destinations over virtually concatenated TDM connections.

Circuit bonding system 301 communicates with base station 103 over links 311. Circuit bonding system 302 communicates with base station 104 over links 312. Links 311-312 are typically T1 and possibly Ethernet connections, although other types of connections could be used. Circuit bonding systems 301-302 communicate with circuit bonding system 303 over TDM links 313-314. Circuit bonding system 303 communicates with services 106 over links 315-317. Links 315-317 are typically T1 or Ethernet connections, although other types of connections could be used.

To provide mobile telephone service, base station 103 exchanges information with a mobile telephone user (not shown) over the air in a wireless signal. Base station 103 exchanges this information with circuit bonding system 301 over a T1 connection in links 311. Thus, base station 103 converts between a wireless format and a T1 format. Circuit bonding system 301 exchanges the information with circuit bonding system 303 over TDM link 313. Circuit bonding system 303 exchanges the information with MSC 107 over a T1 connection in links 315. MSC 107 processes the information to provide mobile telephone service in a conventional manner.

To provide Internet access, base station 103 exchanges information with an Internet user (not shown) over the air in a wireless signal. Base station 103 exchanges this information with circuit bonding system 301 over an Ethernet connection in links 311. Thus, base station 103 converts between a wireless format and an Ethernet format. (Alternatively, base station 103 could exchange the information with circuit bonding system 301 over a T1 connection) Circuit bonding system 301 exchanges the information with circuit bonding system 303 over TDM link 313. Circuit bonding system 303 exchanges the information with Internet access system 108 over an Ethernet connection in links 316. Internet access system 108 processes the information to provide Internet service in a conventional manner. Note that circuit bonding systems 301 and 303 provide Ethernet interfaces to base station 103 and Internet access system 108, but exchange traffic with one another over TDM link 313.

To provide a PTT, VOIP, or another data service, base station 103 exchanges information with a data user (not shown) over the air in a wireless signal. Base station 103 exchanges this information with circuit bonding system 301 over an Ethernet connection in links 311. Thus, base station 103 converts between a wireless format and an Ethernet format. (Alternatively, base station 103 could exchange the information with circuit bonding system 301 over a T1 connection) Circuit bonding system 301 exchanges the information with circuit bonding system 303 over TDM link 313. Circuit bonding system 303 exchanges the information with data systems 109 over an Ethernet connection in links 317. Data systems 109 process the information to provide PTT, VOIP, or another data service in a conventional manner. Note that circuit bonding systems 301 and 303 provide Ethernet interfaces to base station 103 and Internet access system 108, but exchange traffic with one another over TDM link 313.

Base station 104 could provide these same services in the same fashion, as well as other base stations that are not shown for clarity. Note that Ethernet backhaul system 105 aggregates the information for multiple services from multiple base stations. For example, circuit bonding system 303 is a collection point for mobile telephony traffic, Internet access traffic, and data traffic. By aggregating traffic from multiple base stations for multiple services, savings through economy of scale and statistical multiplexing can be attained.

Figure 4:
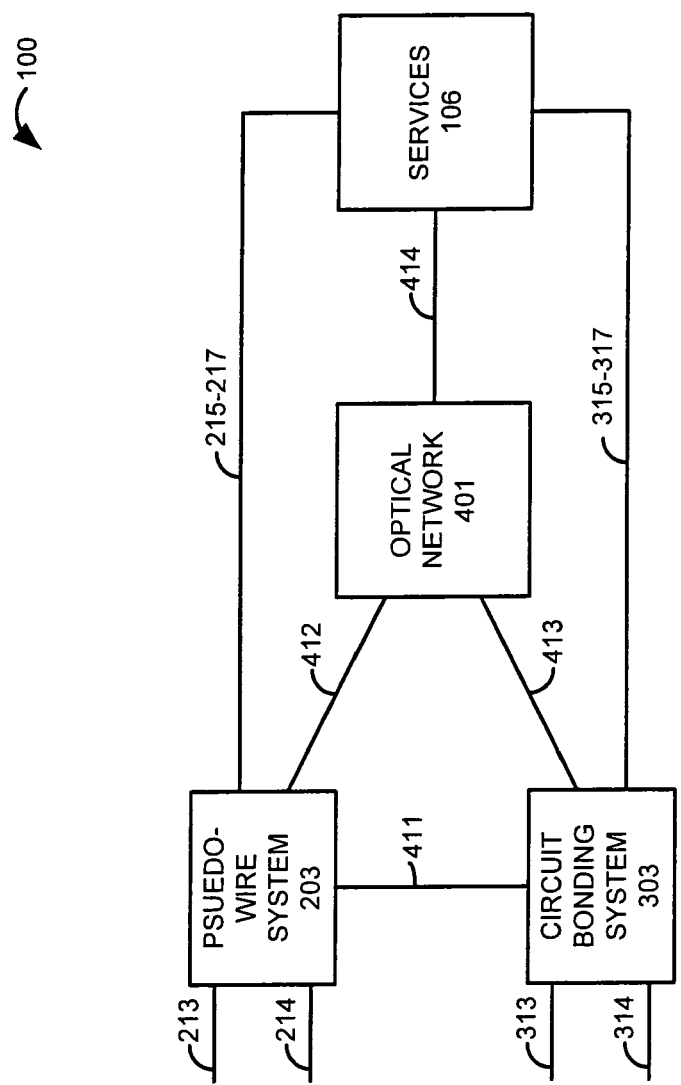
FIG. 4 illustrates a communication system in an example of the invention.

FIG. 4 illustrates communication system 100 in an example of the invention. For clarity, some aspects of FIGS. 1-3 are omitted. Communication system 100 includes pseudo-wire system 203, circuit bonding system 303, services 106, and optical network 401. Optical network 401 could be a SONET system that forms a Metropolitan Area Network (MAN). Pseudo-wire system 203 is coupled to links 213-217 as shown on FIG. 2. Circuit bonding system 303 is coupled to links 313-317 as shown on FIG. 3.

Pseudo-wire system 203 is coupled to circuit bonding system 303 by link 411. Optical network 401 is coupled to pseudo-wire system 203 and circuit bonding system 303 by respective links 412-413. Optical network 401 is coupled to services 106 by links 414, and individual ones of links 414 would be coupled to individual ones of services 106 in the same manner as links 215-217 and links 315-317. Links 411-414 could be Ethernet, T1, SONET, or some other format.

Figure 5:
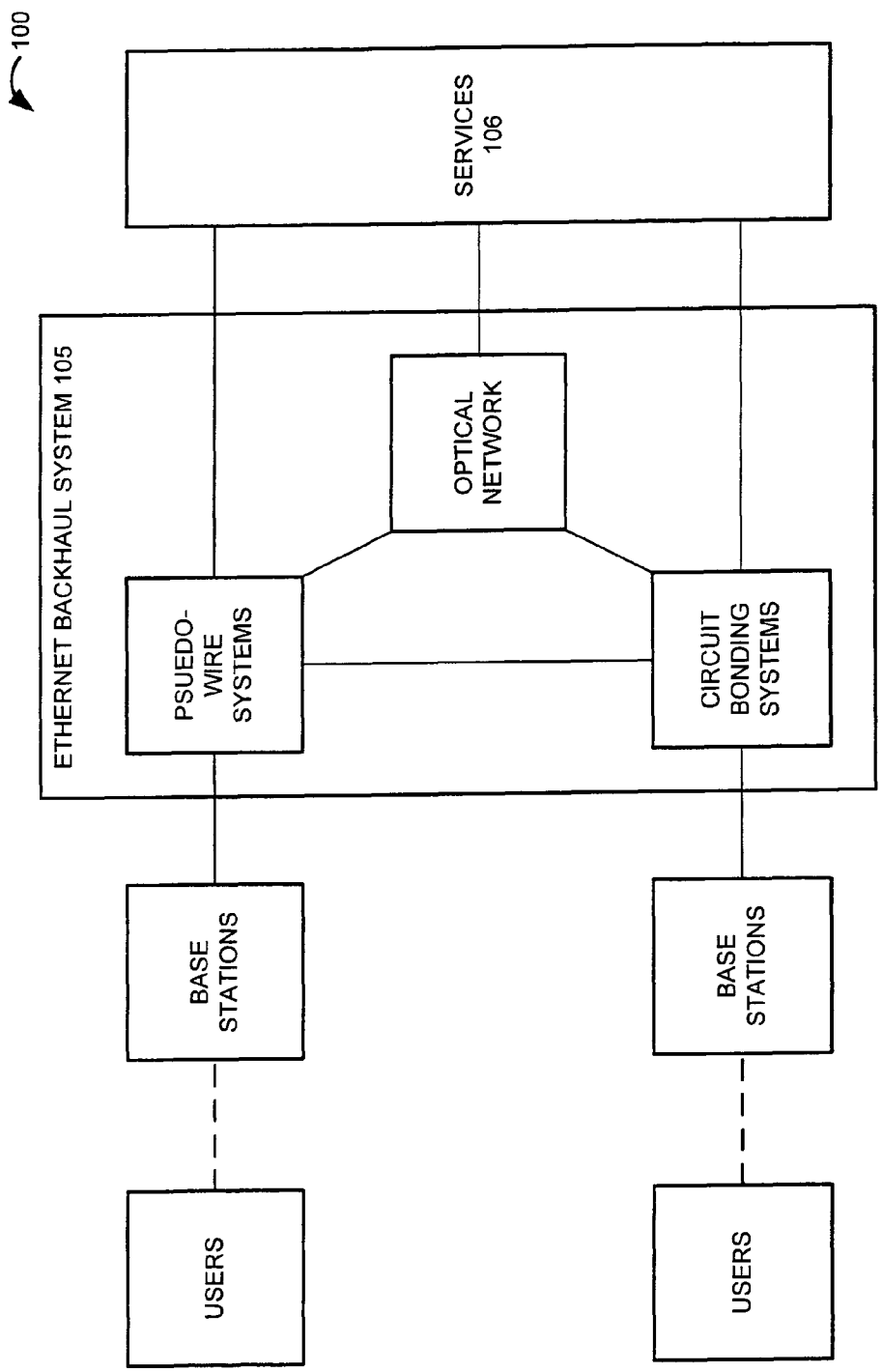
FIG. 5 illustrates a communication system in an example of the invention.

FIG. 5 illustrates communication system 100 in an example of the invention. Communication system 100 includes base stations, Ethernet backhaul system 105, and services 106. Note that communications between the users and services 106 can take many paths: a base station to the psuedo-wire systems to services 106; a base station to the psuedo-wire systems to the optical network to services 106, a base station to the circuit bonding systems to services 106, and a base station to the circuit bonding systems to the optical network to services 106.

Also note that users may communicate with one another over communication system 100. Communications between users can also take many paths: a base station to the pseudo-wire systems to a base station, a base station to the circuit bonding systems to a base station, a base station to the pseudo-wire systems to the circuit bonding systems to a base station, and a base station to the pseudo-wire systems to the optical network to the circuit bonding systems to a base station.

Fault Tolerance

Figure 6:
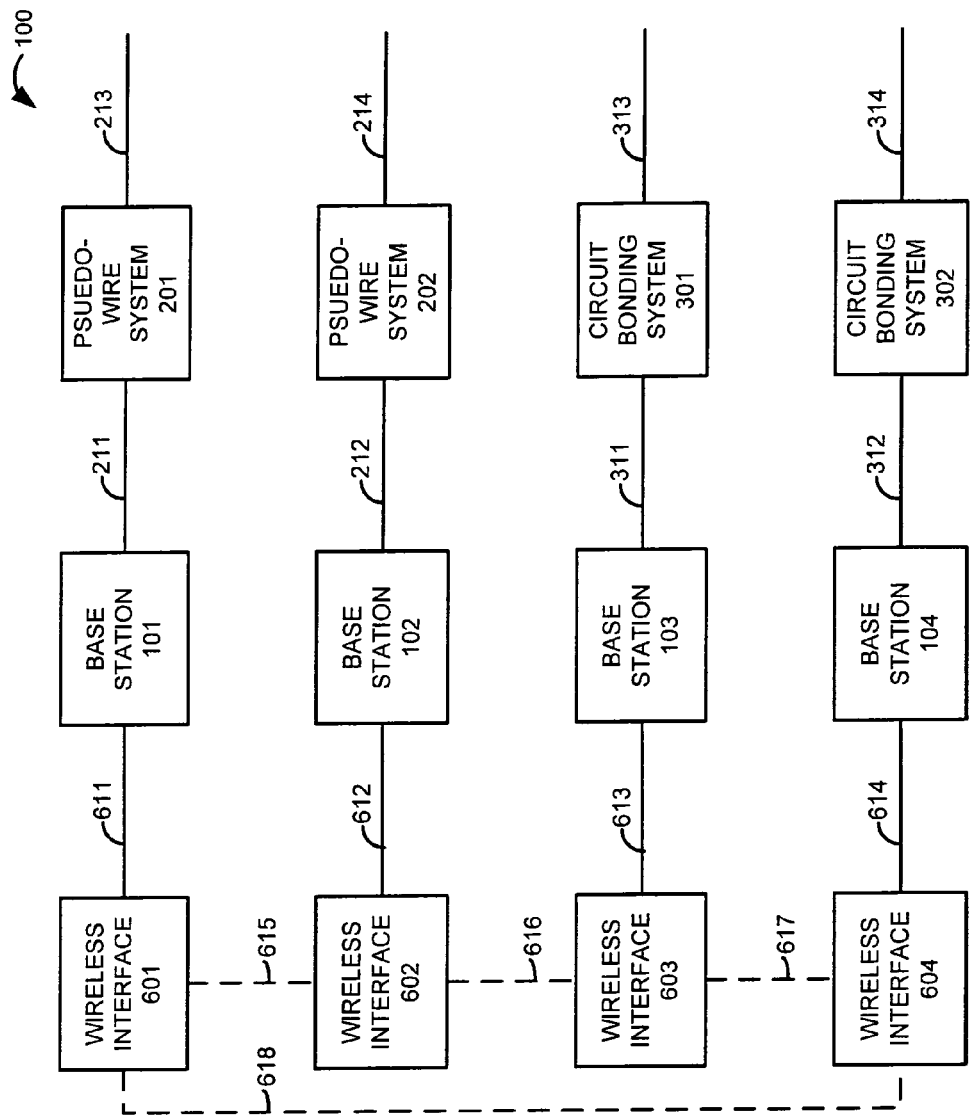
FIG. 6 illustrates fault tolerant aspects of a communication system in an example of the invention.

FIG. 6 illustrates fault tolerant aspects of communication system 100 in an example of the invention. For clarity, some aspects of FIGS. 1-5 are not shown on FIG. 6. Communication system 100 includes base stations 101-104, pseudo-wire systems 201-202, links 211-214, circuit bonding systems 301-302, and links 311-314 that are configured and operate as described above. Communication system 100 also includes wireless interfaces 601-604. Wireless interfaces 601-604 are coupled to respective base stations 101-104 by respective links 611-614. Links 611-614 could use Ethernet, T1, or some other format. Typically, each base station would have a co-located wireless interface. If a base station detects a fault on its link to Ethernet backhaul system 105, then that base station routes the information away from the faulty link and through its wireless interface to a different access point for Ethernet backhaul system 105.

Wireless interfaces 601-604 could be point-to-multipoint radios that transfer wireless Ethernet signals. Wireless interface 601 and wireless interface 602 communicate over the air using wireless link 615. Wireless interface 602 and wireless interface 603 communicate over the air using wireless link 616. Wireless interface 603 and wireless interface 604 communicate over the air using wireless link 617. Wireless interface 601 and wireless interface 604 communicate over the air using wireless link 618. The number of wireless links has been simplified for clarity, and typically, a wireless interface would be linked to all other wireless interfaces that are in radio range.

If base station 101 detects a fault on link 211, possibly caused by a downstream fault on link 213, base station 101 diverts traffic away from link 211 and onto link 611. Wireless interface 601 transfers the traffic from link 611 over wireless link 615 to wireless interface 602. Wireless interface 602 transfers the traffic to base station 102 over link 612, and base station 102 transfers the traffic to pseudo-wire system 202 over link 212. Alternatively, wireless interface 602 could transfer the traffic directly to pseudo-wire system 202 and omit base station 102 from the path. Once the traffic arrives at base station 102 or pseudo-wire system 202, the traffic is handled as described above, and service is restored to the users of base station 101.

If base station 102 detects a fault on link 212, possibly caused by a downstream fault on link 214, base station 102 diverts traffic away from link 212 and onto link 612. Wireless interface 602 transfers the traffic from link 612 over wireless link 616 to wireless interface 603. Wireless interface 603 transfers the traffic to base station 103 over link 613, and base station 103 transfers the traffic to circuit bonding system 301 over link 311. Alternatively, wireless interface 603 could transfer the traffic directly to circuit bonding system 301 and omit base station 103 from the path. Once the traffic arrives at base station 103 or circuit bonding system 301, the traffic is handled as described above, and service is restored to the users of base station 102.

If base station 103 detects a fault on link 311, possibly caused by a downstream fault on link 313, base station 103 diverts traffic away from link 311 and onto link 613. Wireless interface 603 transfers the traffic from link 613 over wireless link 617 to wireless interface 604. Wireless interface 604 transfers the traffic to base station 104 over link 614, and base station 104 transfers the traffic to circuit bonding system 302 over link 312. Alternatively, wireless interface 604 could transfer the traffic directly to circuit bonding system 302 and omit base station 104 from the path. Once the traffic arrives at base station 104 or circuit bonding system 302, the traffic is handled as described above, and service is restored to the users of base station 103.

If base station 104 detects a fault on link 312, possibly caused by a downstream fault on link 314, base station 104 diverts traffic away from link 312 and onto link 614. Wireless interface 604 transfers the traffic from link 614 over wireless link 618 to wireless interface 601. Wireless interface 601 transfers the traffic to base station 101 over link 611, and base station 101 transfers the traffic to pseudo-wire system 201 over link 211. Alternatively, wireless interface 601 could transfer the traffic directly to pseudo-wire system 201 and omit base station 101 from the path. Once the traffic arrives at base station 101 or pseudo-wire system 201, the traffic is handled as described above, and service is restored to the users of base station 104.

The base station that detects the fault can control where the diverted traffic is sent. This could be accomplished by corresponding connections within links 611-614 to wireless connections 615-618. Thus, the base station can control the wireless link that is used for restoration by selecting the appropriate connection within the link to its wireless interface.

The base station that detects the fault could also separate the diverted traffic for transfer to multiple locations. For example, if base station 101 detects a fault on link 211, base station 101 might transfer half of the traffic to base station 102 and the other half of the traffic to base station 104.

Figure 7:
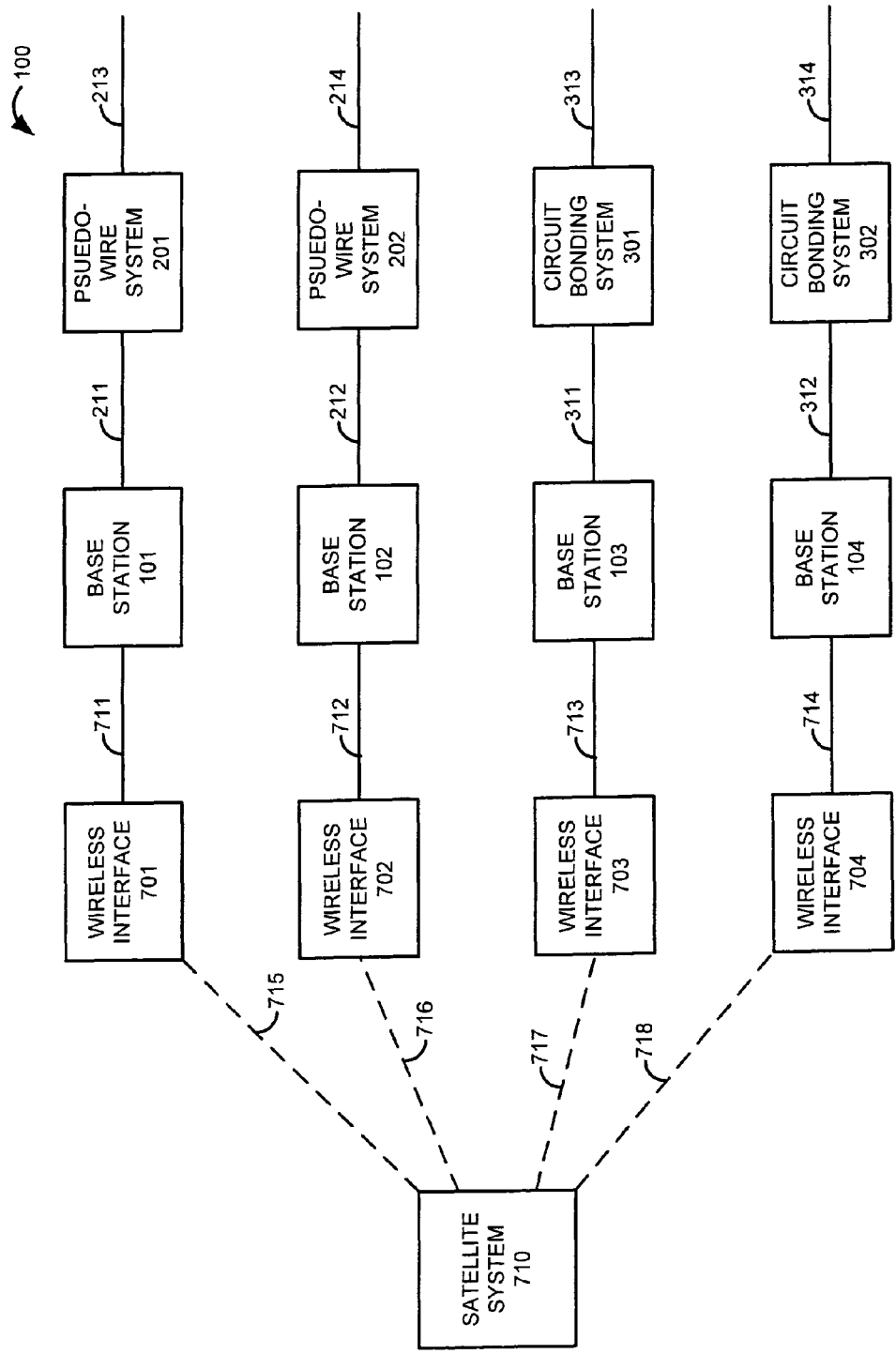
FIG. 7 illustrates fault tolerant aspects of a communication system in an example of the invention.

FIG. 7 illustrates alternate fault tolerant aspects of communication system 100 in an example of the invention. For clarity, some aspects of FIGS. 1-6 are not shown on FIG. 7. Communication system 100 includes base stations 101-104, pseudo-wire systems 201-202, links 211-214, circuit bonding systems 301-302, and links 311-314 that are configured as described above. Communication system 100 also includes wireless interfaces 701-704. Wireless interfaces 701-704 are coupled to respective base stations 101-104 by respective links 711-714. Links 711-714 could use Ethernet, T1, or some other format. Typically, each base station would have a co-located wireless interface.

Wireless interfaces 701-704 communicate with satellite system 710 over respective wireless links 715-718. Satellite system 710 communicates with a ground station (not shown). The ground station communicates with services 106.

If base station 101 detects a fault on link 211, possibly caused by a downstream fault on link 213, base station 101 diverts traffic away from link 211 and onto link 711. Wireless interface 701 transfers the traffic from link 711 over wireless link 715 to satellite system 710. Satellite system 710 transfers the traffic to a ground station, which transfers the traffic to services 106. Once the traffic arrives at services 106, the traffic is handled as described above, and service is restored to the users of base station 101. Other base stations would operate in a similar fashion to provide fault restoration.

Third Party Ethernet Access at Base Station Sites

Figure 8:
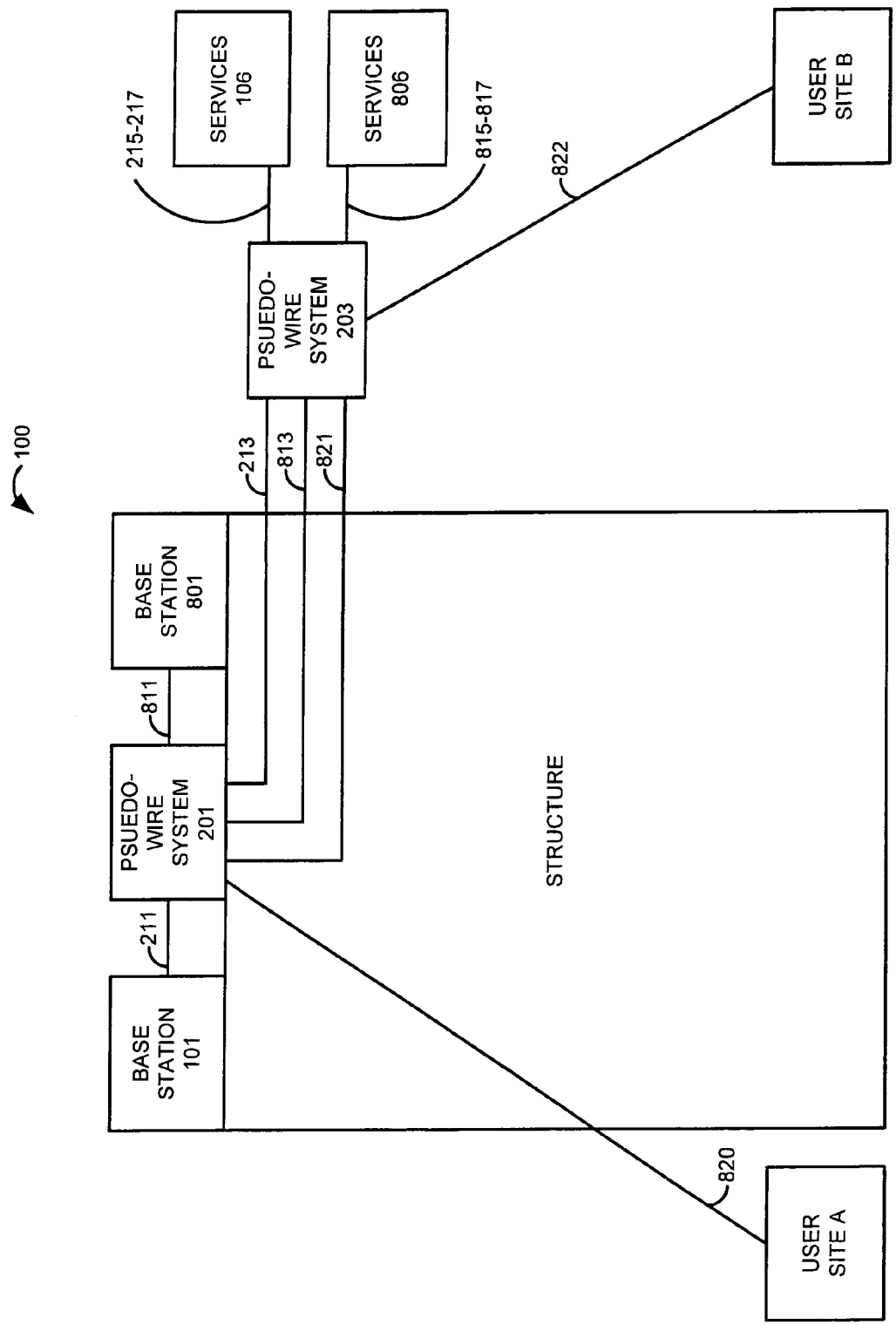
FIG. 8 illustrates Ethernet access aspects of a communication system in an example of the invention.

FIG. 8 illustrates Ethernet access aspects of communication system 100 in an example of the invention. For clarity, some aspects of FIGS. 1-7 are not shown on FIG. 8. Communication system 100 includes base station 101, pseudo-wire systems 201 and 203, services 106, and links 211, 213, and 215-217 that are configured and operate as described above.

Communication system 100 also includes link 820 between user site A and pseudo-wire system 201, link 821 between pseudo-wire system 201 and pseudo-wire system 203, and link 822 between pseudo-wire system 203 and user site B.

FIG. 8 also shows base station 801 and services 806 that are configured and operate in a similar manner to base station 101 and services 106. Note that base station 801 and services 806 are operated by a different service provider than the service provider that operates communication network 100. In the context of the invention, different service providers are separate business entities that offer competing communication services. For example, Sprint and Verizon are separate service providers. Psuedo-wire system 201 communicates with base station 801 over links 811.

Links 811 are typically T1 and possibly Ethernet connections, although other types of connections could be used. Psuedo-wire system 201 communicates with pseudo-wire system 203 over Ethernet link 813. Ethernet link 813 could include intermediate Ethernet nodes and connections. Psuedo-wire system 203 communicates with services 806 over links 815-817. Links 815-817 are typically T1 or Ethernet connections, although other types of connections could be used. Thus, Ethernet backhaul system 105 can be used to backhaul traffic from the co-located base stations of different service providers to their respective services.

Psuedo-wire system 201 communicates with user site A over links 820. Links 820 are typically T1, Ethernet, or wireless connections (including wireless Ethernet), although other types of connections could be used. Psuedo-wire system 201 communicates with pseudo-wire system 203 over Ethernet link 821. Ethernet link 821 could include intermediate Ethernet nodes and connections. Psuedo-wire system 203 communicates with user site B over links 822. Links 822 are typically T1, Ethernet, or wireless connections, although other types of connections could be used. Thus, user site A may communicate with user site B using Ethernet, T1, or some other format over Ethernet backhaul system 105.

Base station 101 and pseudo-wire system 201 are co-located on a structure, such as a building or tower. Although base station 801 is also co-located on the same structure, base station 801 is operated by a different service provider than base station 101. User site A is typically near the structure. Thus, communications network 100 can provide other systems, such as different service providers and nearby user sites with access to Ethernet backhaul system 105 from its base stations. Since numerous base stations are deployed to cover many regions, communications system 100 can offer Ethernet access throughout the many regions from its base station sites. For example, communication system 100 can provide Ethernet backhaul services to the base stations of different service providers that are co-located with base stations 101-104. Although only pseudo-wire systems 201 and 203 are shown, it should be appreciated that other pseudo-wire systems could be used in a similar manner.

Figure 9:
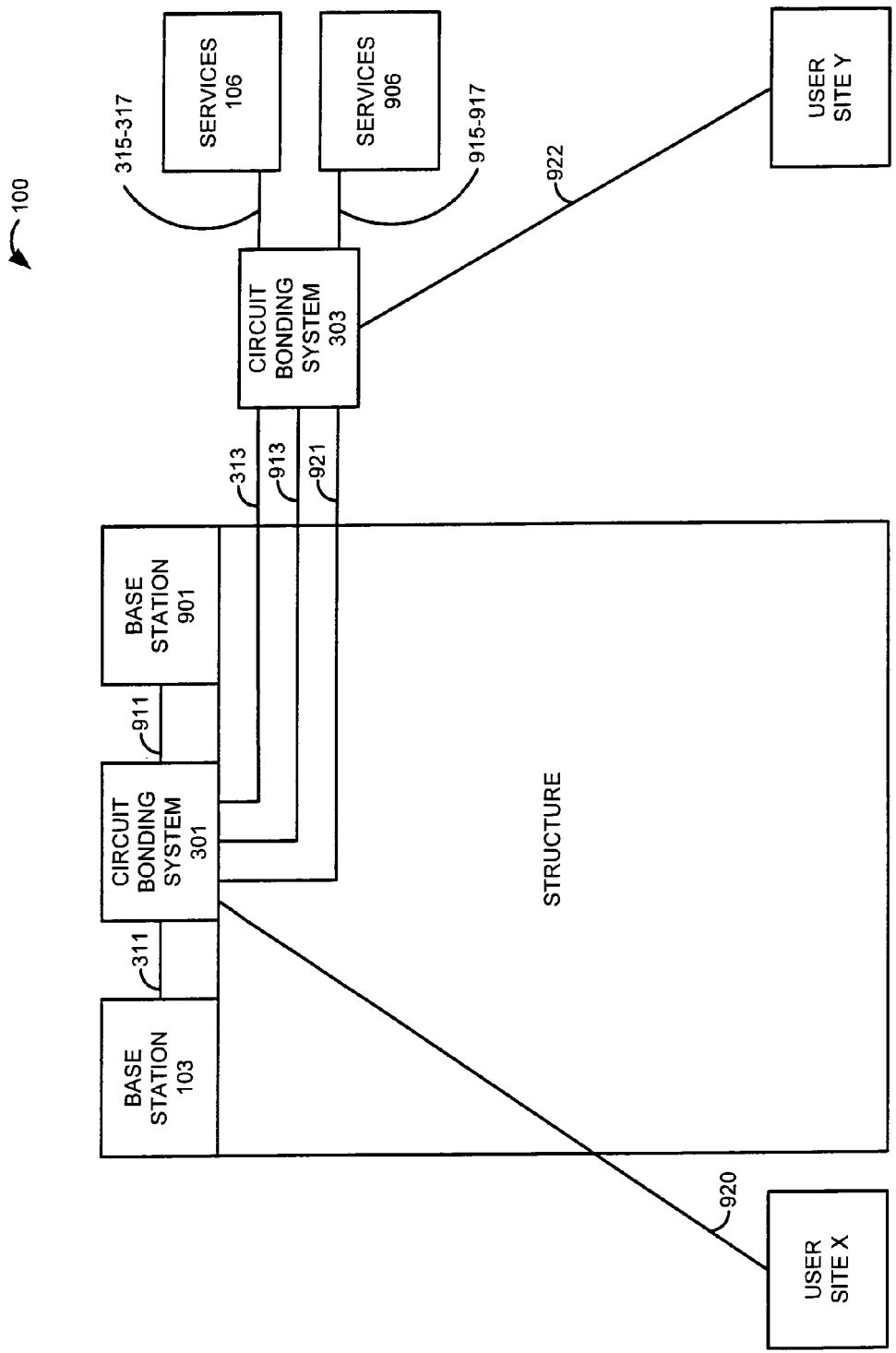
FIG. 9 illustrates Ethernet access aspects of a communication system in an example of the invention.

FIG. 9 illustrates Ethernet access aspects of communication system 100 in an example of the invention. For clarity, some aspects of FIGS. 1-8 are not shown on FIG. 9. Communication system 100 includes base station 103, circuit bonding systems 301 and 303, services 106, and links 311, 313, and 315-317 that are configured and operate as described above. Communication system 100 also includes link 920 between user site X and circuit bonding system 301, link 921 between circuit bonding system 301 and circuit bonding system 303, and link 922 between circuit bonding system 303 and user site Y.

FIG. 9 also shows base station 901 and services 906 that are configured and operate in a similar manner to base station 103 and services 106. Note that base station 901 and services 906 are operated by a different service provider than the service provider that operates communication network 100. In the context of the invention, different service providers are separate business entities that offer competing communication services. For example, Sprint and Verizon are separate service providers.

Circuit bonding system 301 communicates with base station 901 over links 911. Links 911 are typically T1 and possibly Ethernet connections, although other types of connections could be used. Circuit bonding system 301 communicates with circuit bonding system 303 over TDM links 913. TDM links 913 could include intermediate TDM nodes and connections. Circuit bonding system 303 communicates with services 906 over links 915-917. Links 915-917 are typically T1 or Ethernet connections, although other types of connections could be used. Thus, Ethernet backhaul system 105 can be used to backhaul traffic from the co-located base stations of different service providers to their respective services.

Circuit bonding system 301 communicates with user site X over links 920. Links 920 are typically T1, Ethernet, or wireless connections (including wireless Ethernet), although other types of connections could be used. Circuit bonding system 301 communicates with circuit bonding system 303 over TDM links 921. TDM links 921 could include intermediate TDM nodes and connections. Circuit bonding system 303 communicates with user site Y over links 922. Links 922 are typically T1, Ethernet, or wireless connections, although other types of connections could be used. Thus, user site A may communicate with user site B using Ethernet, T1, or some other format over Ethernet backhaul system 105.

Base station 103 and circuit bonding system 301 are co-located on a structure, such as a building or tower. Although base station 901 is also co-located on the same structure, base station 901 is operated by a different service provider than base station 101. User site X is typically near the structure. Thus, communications network 100 can provide other systems, such as different service providers and nearby user sites with access to Ethernet backhaul system 105 from its base stations. Since numerous base stations are deployed to cover many regions, communications system 100 can offer Ethernet access throughout the many regions from its base station sites. For example, communication system 100 can provide Ethernet backhaul services to the base stations of different service providers that are co-located with base stations 101-104. Although only circuit bonding systems 301 and 303 are shown, it should be appreciated that other circuit bonding systems could be used in a similar manner.

Referring to FIGS. 4, 8, and 9, it should be appreciated that user site A could communicate with user site Y by using the links described above and by using a link between the pseudo-wire systems and the circuit bonding systems that is similar to link 411 on FIG. 4.

Ethernet Backhaul System Performance Monitoring

Figure 10:
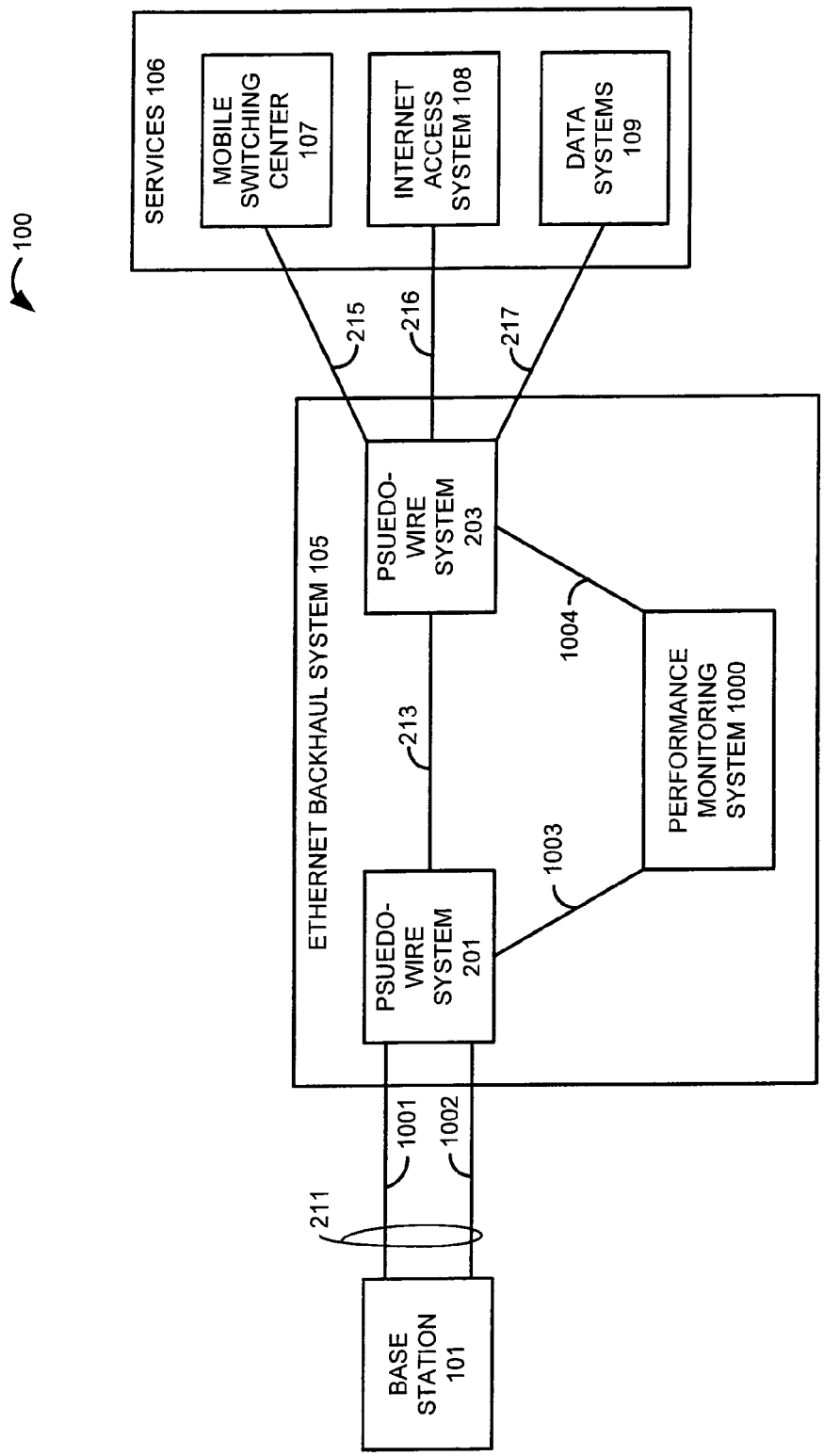
FIG. 10 illustrates performance monitoring aspects of a communication system in an example of the invention.

FIG. 10 illustrates performance monitoring aspects of communication system 100 in an example of the invention. For clarity, some aspects of FIGS. 1-9 are not shown on FIG. 10. Communication system 100 includes base station 101, Ethernet backhaul system 105, services 106, and links 211, 213, 215-217 that are configured and operate as described above.

Note that links 211 are now shown as T1 connection 1001 and Ethernet connection 1002. T1 connection 1001, link 213, and link 215 carry voice traffic that is exchanged between base station 101 and MSC 107. Ethernet connection 1002, link 213, and link 216 carry Internet traffic that is exchanged between base station 101 and Internet access system 108. Ethernet connection 1002, link 213, and link 217 carry data traffic that is exchanged between base station 101 and data systems 109.

Ethernet backhaul system 105 also includes performance monitoring system 1000 that communicates with pseudo-wire systems 201 and 203 over respective links 1003 and 1004. Links 1003 and 1004 could be conventional control links. Performance monitoring system 1000 could be an appropriately programmed computer system. Performance monitoring system 1000 could be distributed across multiple devices including pseudo-wire systems 201 and 203.

Psuedo-wire systems 201 and 203 exchange Ethernet traffic over Ethernet link 213. Ethernet link 213 may have intermediate nodes and links that are not shown for clarity. Ethernet backhaul system 105 may obtain Ethernet link 213 from a third party, such as a cable television company, that does not provide adequate performance monitoring data for Ethernet link 213. Psuedo-wire systems 201 and 203 transfer performance data to performance monitoring system 1000.

The performance data indicates transmitted idle blocks for pseudo-wire systems 201 and 203. The level of transmitted idle blocks correlates to packet loss over Ethernet link 213. Thus, an unacceptable level of packet loss on Ethernet link 213 correlates to a threshold level of transmitted idle blocks for pseudo-wire systems 201 and 203. If the level of these transmitted idle blocks reaches this threshold, then a situation of unacceptable packet loss is identified.

If a situation of unacceptable packet loss is identified, then performance monitoring system 1000 transfers control instructions that cause pseudo-wire systems 201 and 203 to take remedial action. One form of remedial action is bandwidth prioritization. The bandwidth that is allocated to connections 1001-1002 may be prioritized, so that if needed, bandwidth may reallocated from a lower priority connection to a higher-priority connection.

For example, assume that the voice traffic on connection 1001 has a higher priority than the Internet and data traffic on connection 1002. If performance monitoring system 1000 determines that level of transmitted idle blocks for pseudo-wire systems 201 and 203 has reached the threshold, then a situation of unacceptable packet loss is identified. In response, performance monitoring system 1000 instructs pseudo-wire system 201 to reduce or eliminate the bandwidth on link 213 that is allocated to connection 1002 and increase the bandwidth on link 213 that is allocated to connection 1001. Performance monitoring system 1000 also instructs pseudo-wire system 203 to reduce or eliminate the bandwidth on link 213 that is allocated to links 216-217 and increase the bandwidth on link 213 that is allocated to link 215. As a result, high-priority voice traffic between base station 101 and MSC 107 is given bandwidth priority at the expense of bandwidth for the Internet and data traffic.

The performance data also indicates received jitter for pseudo-wire systems 201 and 203. The level of received jitter correlates to network instantaneous peak jitter over Ethernet link 213. Thus, an unacceptable level of network instantaneous peak jitter correlates to a threshold level of received jitter for pseudo-wire systems 201 and 203. If the level of received this jitter reaches the threshold, then a situation of unacceptable network instantaneous peak jitter is identified.

If a situation of unacceptable network instantaneous peak jitter is identified, then performance monitoring system 1000 transfers control instructions that cause pseudo-wire systems 201 and 203 to take remedial action. The remedial action could be bandwidth prioritization as discussed above.

For example, assume that the voice traffic on connection 1001 has a higher priority than the Internet and data traffic on connection 1002. If performance monitoring system 1000 determines that level of received jitter for pseudo-wire systems 201 and 203 has reached the threshold, then a situation of unacceptable network instantaneous peak jitter is identified. In response, performance monitoring system 1000 instructs pseudo-wire system 201 to reduce or eliminate the bandwidth on link 213 that is allocated to connection 1002 and increase the bandwidth on link 213 that is allocated to connection 1001. Performance monitoring system 1000 also instructs pseudo-wire system 203 to reduce or eliminate the bandwidth on link 213 that is allocated to links 216-217 and increase the bandwidth on link 213 that is allocated to link 215. As a result, high-priority voice traffic between base station 101 and MSC 107 is given bandwidth priority at the expense of bandwidth for the Internet and data traffic.

Thus, performance monitoring system 1000 is configured to monitor performance at ingress and egress points (systems 201 and 203) for Ethernet backhaul system 105, and in response, to reallocate bandwidth within Ethernet backhaul system 105 among the various services (mobile telephone service, Internet access service, and data service) provided by services 106.

Communication System Extension Over a Cable Television Distribution Network

Figure 11:
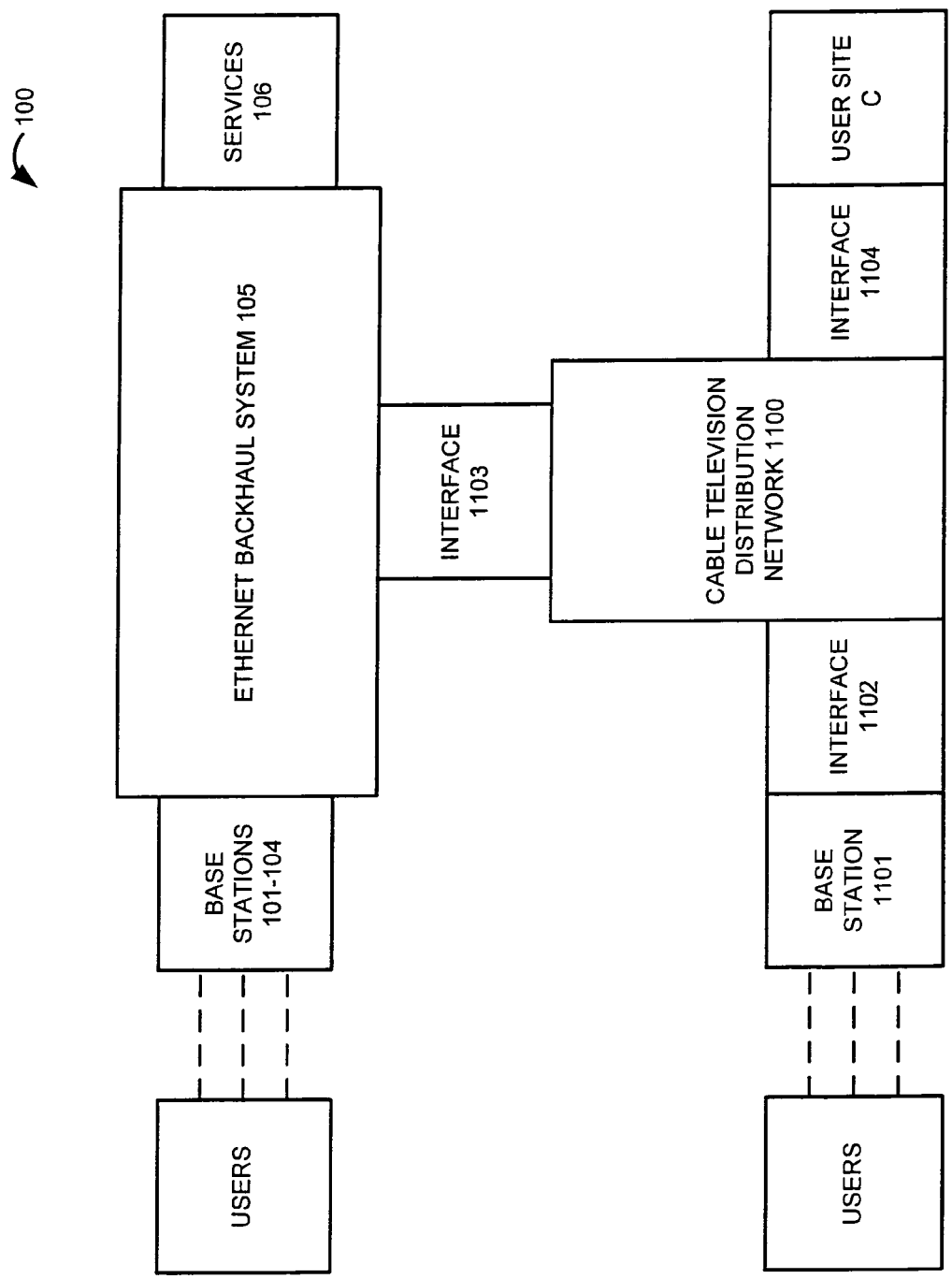
FIG. 11 illustrates an extension of a communication system through a cable television distribution network in an example of the invention.

FIG. 11 illustrates an extension of communication system 100 through cable television distribution network 1100 in an example of the invention. For clarity, some aspects of FIGS. 1-10 are omitted on FIG. 11. Communication system 100 includes base stations 101-104, Ethernet backhaul system 105, and services 106 that are configured and operate as described above.

Communication system 100 also includes cable television distribution network 1100, base station 1101, and interfaces 1102-1104. Base station 1101 exchanges information with users over wireless communication links as described above for base stations 101-104. Base station 1101 exchanges the information with interface 1102. Interface 1102 exchanges the information with interface 1103 over cable television distribution network 1100. Interface 1103 exchanges the information with Ethernet backhaul system 105. Ethernet backhaul system 105 exchanges the information with services 106 in the same manner as described above for base stations 101-104. Thus, base station 1101 exchanges the information with services 106 over interfaces 1102-1103, cable television distribution network 1100, and Ethernet backhaul system 105.

Likewise, interface 1104 exchanges information with user site C. Interface 1104 exchanges the information with interface 1103 over cable television distribution network 1100. Interface 1103 exchanges the information with Ethernet backhaul system 105. Ethernet backhaul system 105 exchanges the information with other user sites or services as described above.

Figure 12:
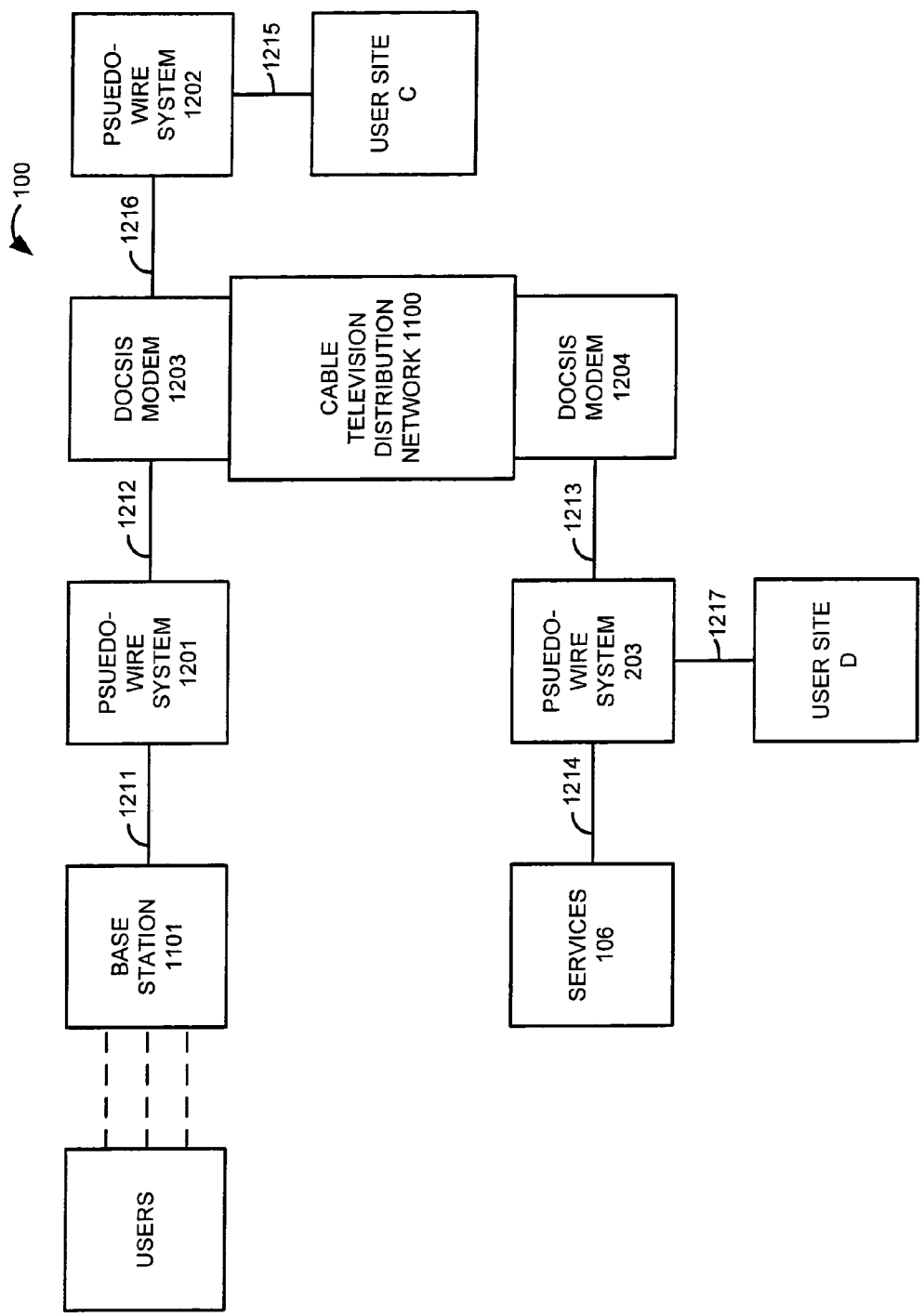
FIG. 12 illustrates an extension of a communication system through a cable television distribution network in an example of the invention.

FIG. 12 illustrates an extension of communication system 100 through cable television distribution network 1100 in an example of the invention. For clarity, some aspects of FIGS. 1-11 are omitted on FIG. 12. Communication system 100 includes services 106, pseudo-wire system 203, cable television distribution network 1100, and base station 1101 that are configured and operate as described above. Communication system 100 also includes pseudo-wire systems 1201-1202 and DOCSIS modems 1203-1204.

Psuedo-wire system 1201 communicates with base station 1101 over links 1211.

Links 1211 are typically T1 and possibly Ethernet connections, although other types of connections could be used. Psuedo-wire system 1201 communicates with DOCSIS modem 1203 over Ethernet link 1212. DOCSIS modem 1203 communicates with DOCSIS modem 1204 over cable television distribution network 1100.

In some examples DOCSIS modem 1204 is integrated within a Cable Modem Termination System (CMTS) that communicates with multiple DOCSIS modems over distribution network 1100. Note that the number of DOCSIS modems shown on FIG. 12 has been restricted for clarity, but multiple DOCSIS modems may access and share the bandwidth of a single cable television channel. Thus, multiple base stations with corresponding pseudo-wire systems and DOCSIS modems could exchange traffic with Ethernet backhaul system 105 over a single cable television channel in cable television distribution network 1100. For example, DOCSIS modems 1203-1204 could use DOCSIS version 2.0 to exchange information over a 6 megahertz cable television channel that is provisioned between modems 1203-1204 through network 1100.

DOCSIS modem 1204 communicates with pseudo-wire system 203 over Ethernet link 1213. Ethernet link 1213 could include intermediate Ethernet nodes and connections. Psuedo-wire system 203 communicates with services 106 over links 1214. Psuedo-wire system 203 aggregates and distributes the traffic between base station 1101 and services 106 in a similar manner as described above for base stations 101-104. Thus, base station 1101 exchanges information between wireless users and services 106 (MSC 107, Internet access system 108, and data systems 109) over pseudo-wire systems 1201 and 203, DOCSIS modems 1203-1204, and cable television distribution network 1100.

Psuedo-wire system 1202 communicates with user site C over link 1215. Link 1215 could be T1, Ethernet, wireless, or some other type of connection. Psuedo-wire system 1202 communicates with DOCSIS modem 1203 over Ethernet link 1216. DOCSIS modem 1203 communicates with DOCSIS modem 1204 over cable television distribution network 1100. DOCSIS modem 1204 communicates with pseudo-wire system 203 over Ethernet link 1213. Ethernet link 1213 could include intermediate Ethernet nodes and connections. Psuedo-wire system 203 communicates with user site D over link 1217, which could be T1, Ethernet, wireless, or some other type of connection. Thus, user sites C and D exchange information over pseudo-wire systems 1202 and 203, DOCSIS modems 1203-1204, and cable television distribution network 1100.

The invention claimed is:

1. A communication system comprising: a plurality of first base stations configured to exchange first information with first users over first wireless communication links; a mobile switching center configured to provide mobile telephone service; an Internet access system configured to provide Internet access service; a data system configured to provide a data service;

a first pseudo-wire system configured to exchange the first information with the first base stations over first T1 connections, aggregate the first information of the first users, and exchange the first information with an Ethernet backhaul system using an Ethernet format;

the Ethernet backhaul system configured to use the Ethernet format to exchange the first information between the first pseudo-wire system and the mobile switching center, the Internet access system, and the data system;

and a second base station configured to exchange second information with second users over second wireless communication links;

a second pseudo-wire system configured to exchange the second information with the second base station over a second T1 connection, aggregate the second information of the second users, and exchange the second information with a second interface over a cable television distribution network using the Ethernet format;

wherein the second pseudo-wire system is configured to aggregate a first portion of the second information for exchange with the mobile switching center, aggregate a second portion of the second information for exchange with the Internet access system, and aggregate a third portion of the second information for exchange with the data system;

wherein the second pseudo-wire system is configured to increase a first bandwidth allocated to the first portion, decrease a second bandwidth allocated to the second portion, and decrease a third bandwidth allocated to the third portion over the Ethernet backhaul system when transmitted idle blocks over the Ethernet backhaul system reach a threshold level;

and the Ethernet backhaul system configured to use the Ethernet format to exchange the second information between the second interface and the mobile switching center, the Internet access system, and the data system.

2. The communication system of claim 1 wherein the second pseudo-wire system and the second interface further comprise DOCSIS modems.

3. The communication system of claim 1 wherein the second pseudo-wire system and the second interface further comprise DOCSIS version 2.0 modems.

4. The communication system of claim 1 wherein the second pseudo-wire system and the second interface are configured to exchange the second information over a cable television channel that is provisioned through the cable television distribution network between the second pseudo-wire system and the second interface.

5. The communication system of claim 1 wherein the second pseudo-wire system and the second interface are configured to exchange the second information over a six megahertz cable television channel that is provisioned through the cable television distribution network between the second pseudo-wire system and the second interface.

6. The communications system of claim 1 wherein: the second pseudo-wire system is configured to exchange third information with a first user site over a third T1 connection; the second interface is configured to exchange the third information with the second pseudo-wire system over the cable television distribution network in the Ethernet format; and the Ethernet backhaul system is configured to use the Ethernet format to exchange the third information between the second interface and a second user site.

7. The communication system of claim 6 wherein the second pseudo-wire system and the second interface are configured to exchange the third information over a cable television channel that is provisioned through the cable television distribution network between the second pseudo-wire system and the second interface.

8. A method of operating a communication system, the method comprising: in a plurality of first base stations, exchanging first information with first users over first wireless communication links; in a mobile switching center, providing a mobile telephone service; in an Internet access system, providing an Internet access service; in a data system, providing a data service; in a first pseudo-wire interface, exchanging the first information with the first base stations over first T1 connections, aggregating the first information of the first users, and exchanging the first information with an Ethernet backhaul system using an Ethernet format; in the Ethernet backhaul system, using the Ethernet format to exchange the first information between the first pseudo-wire interface and the mobile switching center, the Internet access system, and the data system; and in a second base station, exchanging second information with second users over second wireless communication links; in a second pseudo-wire interface, exchanging the second information with the second base station over a second T1 connection, aggregating the second information of the second users, and exchanging the second information with a second interface over a cable television distribution network using the Ethernet format; and in the Ethernet backhaul system, using the Ethernet format to exchange the second information between the second interface and the mobile switching center, the Internet access system, and the data system; wherein using the Ethernet format to exchange the second information between the second pseudo-wire interface and the mobile switching center, the Internet access system, and the data system comprises aggregating a first portion of the second information for exchange with the mobile switching center, aggregating a second portion of the second information for exchange with the Internet access system, and aggregating a third portion of the second information for exchange with the data system; and wherein in the second pseudo-wire interface, increasing a first bandwidth allocated to the first portion, decreasing a second bandwidth allocated to the second portion, and decreasing a third bandwidth allocated to the third portion over the Ethernet backhaul system when transmitted idle blocks over the Ethernet backhaul system reach a threshold level.

9. The method of claim 8 wherein the second pseudo-wire interface and the second interface further comprise DOCSIS modems.

10. The method of claim 8 wherein the second pseudo-wire interface and the second interface further comprise DOCSIS version 2.0 modems.

11. The method of claim 8 wherein exchanging the second information between the second pseudo-wire interface and the second interface over the cable television distribution network comprises exchanging the second information over a cable television channel that is provisioned through the cable television distribution network between the second pseudo-wire interface and the second interface.

12. The method of claim 8 wherein exchanging the second information between the second pseudo-wire interface and the second interface over the cable television distribution network comprises exchanging the second information over a six megahertz cable television channel that is provisioned through the cable television distribution network between the second pseudo-wire interface and the second interface.

13. The method of claim 8 further comprising: in the second pseudo-wire interface, exchanging third information with a first user site; in the second interface, exchanging the third information with the second pseudo-wire interface over the cable television distribution network; and in the Ethernet backhaul system, using the Ethernet format to exchange the third information between the second interface and a second user site.

14. The method of claim 13 wherein exchanging the third information between the second pseudo-wire interface and the second interface over the cable television distribution network comprises exchanging the third information over a cable television channel that is provisioned through the cable television distribution network between the second pseudo-wire interface and the second interface.

* * * * *